United States Patent
Chowdhury et al.

(10) Patent No.: US 10,740,559 B2
(45) Date of Patent: Aug. 11, 2020

(54) DOMAIN-SPECIFIC TERMINOLOGY EXTRACTION BY BOOSTING FREQUENCY METRICS

(71) Applicant: International Business Machines Corporation, Armonk, NY (US)

(72) Inventors: Md Faisal Mahbub Chowdhury, Yorktown Heights, NY (US); Alfio Massimiliano Gliozzo, New York, NY (US); Sharon Mary Trewin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 15/469,766

(22) Filed: Mar. 27, 2017

(65) Prior Publication Data
US 2018/0276196 A1    Sep. 27, 2018

(51) Int. Cl.
| | |
|---|---|
| *G06F 16/2457* | (2019.01) |
| *G06F 40/295* | (2020.01) |
| *G06F 16/242* | (2019.01) |
| *G06F 16/28* | (2019.01) |
| *G06F 16/33* | (2019.01) |
| *G06F 16/35* | (2019.01) |

(Continued)

(52) U.S. Cl.
CPC .......... *G06F 40/295* (2020.01); *G06F 16/243* (2019.01); *G06F 16/24578* (2019.01); *G06F 16/289* (2019.01); *G06F 16/334* (2019.01); *G06F 16/353* (2019.01); *G06F 16/36* (2019.01); *G06F 16/951* (2019.01); *G06F 40/284* (2020.01); *G06F 40/40* (2020.01)

(58) Field of Classification Search
CPC ...... G06F 40/40; G06F 40/284; G06F 40/295; G06F 16/247; G06F 16/289; G06F 16/253; G06F 16/334; G06F 16/36; G06F 16/24578; G06F 16/951
See application file for complete search history.

(56) References Cited

U.S. PATENT DOCUMENTS

| | | |
|---|---|---|
| 6,549,897 B1 | 4/2003 | Katariya et al. |
| 7,873,640 B2 | 1/2011 | Chang et al. |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Robert W Beausoliel, Jr.
*Assistant Examiner* — Hau Hoang
(74) *Attorney, Agent, or Firm* — Anthony R. Curro, Esq.; McGinn IP Law Group, PLLC (57) ABSTRACT

A terminology extraction method, system, and computer program product include extracting terminology specific to a domain from a corpus of domain-specific text, where no external general domain reference corpus is required. The method assumes that terms which share common noun token(s) in a domain corpus are likely to be very related, that terms which are very related in a domain are likely to be equally or similarly important even though there might be large differences among their term frequencies, and that an abbreviation and its corresponding expansion have equal importance as terms.

11 Claims, 5 Drawing Sheets

(51) Int. Cl.
  *G06F 16/951* (2019.01)
  *G06F 16/36* (2019.01)
  *G06F 40/40* (2020.01)
  *G06F 40/284* (2020.01)

(56) References Cited

U.S. PATENT DOCUMENTS 9,311,391 B2     4/2016  Lepsoy et al.
2007/0288433 A1* 12/2007  Gupta ................ G06F 16/3334

OTHER PUBLICATIONS

Agrawal, C. C. & Zhai, C. X. (2012). "A Survey of Text Clustering Algorithms". Mining Test Data. 77-128. See p. 81, section 2.1.1-p. 83, end of full paragraph.
Shao, J., Jiang, D. & Wang, M. et al. (2010). "Multi-Video Summarization Using Complex Graph Clustering and Mining". Computer Science and Information Systems 2010, 7(1). doi: 10.2298/CSIS1001085S. See p. 87, section 2.1-p. 88, section, 2.2.

* cited by examiner

FIG. 1

INFORMATION VERIFICATION METHOD 100

DOMAIN-SPECIFIC TERMINOLOGY EXTRACTION BY BOOSTING FREQUENCY METRICS

BACKGROUND

The present invention relates generally to a terminology extraction method applicable to a cloud computing environment, and more particularly, but not by way of limitation, to a system, method, and computer program product for extracting terminology (specific to the domain) automatically with an unsupervised approach.

Conventionally, automatic terminology recognition/extraction (ATR) approaches extract candidate terms from the given corpus, ranking them using an ATR ranking technique, sorting the candidate terms according to ranking scores, and finally, selecting the top N terms or terms with ranking scores above a certain threshold as the terminology.

The conventional c-value technique has limitations such as the c-value technique is biased towards the terms with more tokens in them (i.e., if a term has more words/tokens, it has higher probability of being ranked higher than a term with less words/tokens). The c-value technique is designed for the recognition of multi-word terms and hence fails to extract domain-specific single word terms. Also, the Term Frequency-Inverse Document Frequency (TF-IDF) technique has limitations such as if a term occurs in almost all of the documents (of the corpus), the IDF score for that term would be zero or near to zero. This is problematic because sometimes terms which are domain-specific are also common across documents. Further, assuming a term A is related to another term B and shares common tokens (e.g. "battery", "lead-acid battery", "battery recycling process" where the token is "battery"), if the Term Frequency (TF) of A is high but the TF of B is low and both of the terms have almost same IDF, A will be ranked higher but B will be ranked at the bottom. However, this is not desirable. Intuitively, the high ranking of one term implies that any strongly-related term is likely to be of similar importance in the domain even if it occurs infrequently. TF-IDF does not take this in consideration.

SUMMARY

In an exemplary embodiment, the present invention can provide a computer-implemented terminology extraction method, the method including extracting candidate terms from a corpus of text, calculating a Boosted Term Frequency (BTF) and a Boosted Inverse Document Frequency (BIDF) for the candidate terms with a relation to other candidate terms to obtain a BTF-BIDF score, and ranking the candidate terms based on the BTF-BIDF score. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
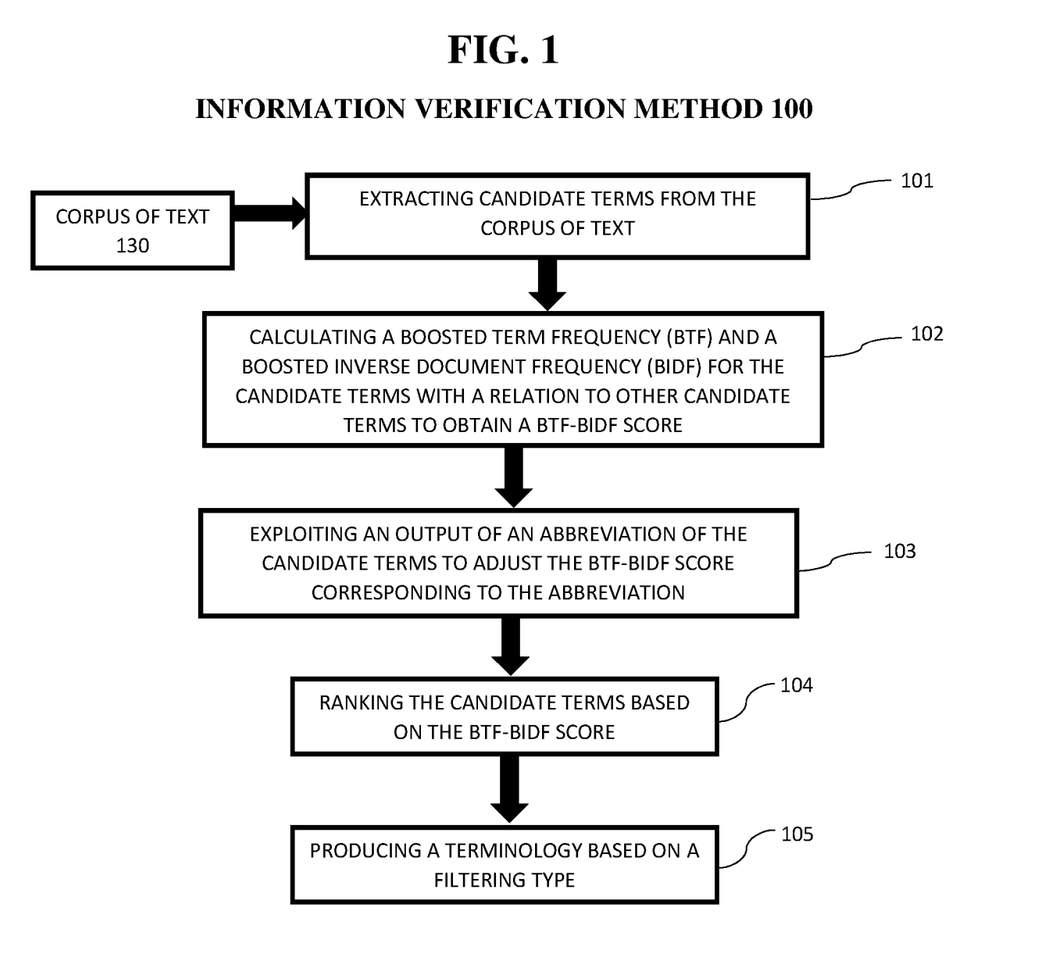
FIG. 1 exemplarily shows a high-level flow chart for a terminology extraction method 100 according to an embodiment of the present invention.

By way of introduction of the example depicted in FIG. 1, an embodiment of a terminology extraction method 100 according to the present invention care include various steps for ranking terms in a corpus by boosting the rank of terms containing words that appear frequently in other terms, or that smooths out ranking differences between such terms.

Figure 3:
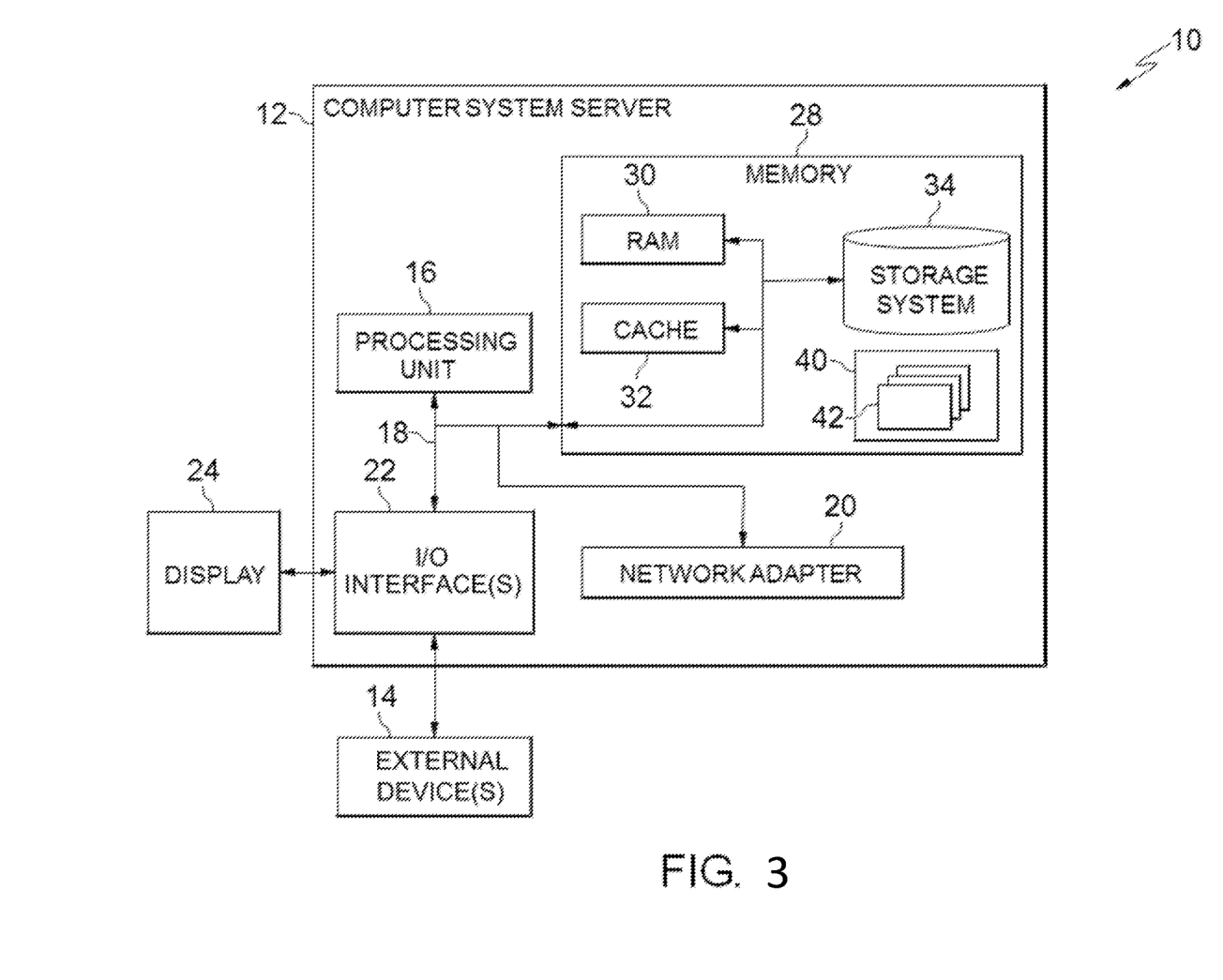
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

With reference now to FIG. 1, in step 101, a corpus of text 130 is received and candidate terms are extracted from the corpus of text 130. That is, candidate terms are extracted to reduce the search space. Linguistic rules and statistics are exploited to do so such that, for every document, all the noun phrases (NP) and foreign words are first extracted. Then, all NPs are filtered that are not valid candidate terms. An NP or foreign word would be considered as a valid candidate term if all the following criteria hold: (1) it must not have any characters other than a-z, A-Z, 0-9, comma, dot and dash, (2) it must start and end with either a-z, A-Z, 0-9 or dot, (3) it must contain more than one letter(a-z, A-Z), (4) it must have at least three alphanumeric characters, (5) it must not have more than four digits, (6) it must have at most one token consisting of digits, (7) it must not have a token with less than two characters, and (8) it cannot start with an adjective that has been observed as a token in at least ten different NPs in the corpus (e.g., the token "other" is an adjective in the NP "other sausage". If "other" has been a token in at least 10 different NPs, then all these NPs will be ignored). Optionally, the system allows the user to specify the minimum frequency an NP must have before being considered as a candidate term.

In step 102, a combined Boosted Term Frequency and a Boosted Inverse Document Frequency "(BTF-BIDF) score" is obtained by calculating a Boosted Term Frequency (BTF) and a Boosted Inverse Document Frequency (BIDF) for the candidate terms with a relation to other candidate terms of the corpus of text 130. It is assumed that team which are "very" related in a domain are likely to be equally or similarly important even though there might be large differences among their terra frequencies (i.e., the term "battery" may appear only once in a document (low term frequency) and the term "lead-acid battery" may appear a hundred times in document (higher term frequency), but "battery" and "lead-acid battery" are very related).

The BTF of a term is calculated as the Term Frequency (TF) of the term plus the square-root of the average difference of the TF of the term itself and those of any noun token whose TFs are greater than or equal to the TF of the term. It is noted that the noun token is each noun in the term (i.e., the noun tokens of "lead-acid battery" are "lead", "acid", and "battery").

$$BTF(\text{term}) = TF(\text{term}) + \sqrt{\text{average}(\sum_{toekn \in term:token\ ISA\ noun\ \&\ TF(token) \geq TF(term)} (TF(\text{token}) - TF(\text{term})))} \quad (1)$$

For example, if TF("lead-acid battery")=10; TF("battery")=120; TF("lead")=20; and TF("acid")=20, then BTF (lead-acid battery)=10+sqrt (((120−10)+(20−10)+(20−10))/3)=16.58.

Therefore, although "lead-acid battery" only has a term frequency of 10, the BTF is 16.58 by considering the Boosted Term Frequency according to step 102.

For the Boosted Inverse Document Frequency (BIDF), it assumed that terms which share common noun token(s) in a domain corpus are likely to be very related. First, the BIDF is calculated for all noun tokens of all the terms. The IDF(T)=log (N/$N_T$) where N is the number of documents and $N_T$ is the number of documents having the term (i.e., if three documents are in the corpus of text, N=3, and if two documents of the three include the term, $N_T$=2). The BIDF of a noun token is a highest IDF among all the terms that contain that token. For example, if IDF(battery)=0.0, IDF (lead-acid battery)=3.6, and IDF(battery pack)=7.9, then BIDF(battery)=7.9. Then, the BIDF is calculated of terms based on the BIDF of the noun tokens. The BIDF of a term is the highest BIDF among its tokens. For example, if BIDF(battery)=7.9, BIDF(lead)=4, BIDF(acid)=4.9, BIDF (lead-acid battery)=7.9.

For example, if IDF(act)=0.01, IDF(money laundering act)=4.6, and IDF(foreign exchange management act)=7.3, then BIDF(act)=7.3. Then, the BIDF is calculated of terms based on the BIDF of the tokens. The BIDF of a term is the highest BIDF among its tokens. For example, if BIDF (act)=7.3, BIDF(money)=4.8, BIDF(money laundering act)=7.3.

The BTF-BIDF (i.e., BTF* BIDF) score for every term is calculated and is normalized by dividing it with the highest BTF-BIDF score among the terms in the corpus. Any term with a zero (0) BTF-BIDF score is discarded. The resulting normalized BTF-BIDF score ranges between 0.0 and 1.0.

In step 103, an output is exploited of an abbreviation of the candidate terms to adjust the BTF-BIDF score corresponding to the abbreviation. That is, it is assumed that an abbreviation and its corresponding expansion have equal importance as terms (i.e., "IBM" and "International Business Machines" are equally important). For any abbreviation and expansion pair, whichever of them has the higher BTF-BIDF score, the other one is also assigned the same score. Thus, if "IBM" has a BTF-BIDF score of 7 and "International Business Machines" of 0. "International Business Machines" is assigned a BTF-BIDF of 7. Hence, for any abbreviation and expansion pair, whichever of them has a higher BTF-BIDF score, the other one is assigned the same score (i.e., abbreviation and expansion pair score equals each other). That is, these terms should be ranked relative to each other. An abbreviation is basically a type of synonym of its expansion. The aforementioned technique can be easily extended to other types of synonyms (e.g. "police" and "cop").

In step 104, the candidate terms are ranked based on the BTF-BIDF score (i.e., from highest to lowest). For example, the top 10 ranked terms from a corpus of European battery regulations using BTF-BIDF are as following: "1. accumulator, 2. battery, 3. European union, 4. recycling process, 5. member state, 6. European parliament, 7. automotive battery, 8. cadmium, 9. distortion of competition, 10. battery-pack". All candidate terms are ranked according to the normalized BTF-BIDF score in descending order.

In step 105, a terminology is produced based on a filtering type (i.e., a terminology is extracted from the ranked list of terms based on one of the filtering options). That is, the ranked list is further filtered by, for example, filtering the candidate terms below a median score of the BTF-BIDF score, filtering the candidate terms based on an average score of the BTF-BIDF score, filtering the candidate terms based on a threshold value of the BTF-BIDF score, and/or keeping only a predetermined first number of candidate terms.

Figure 2:
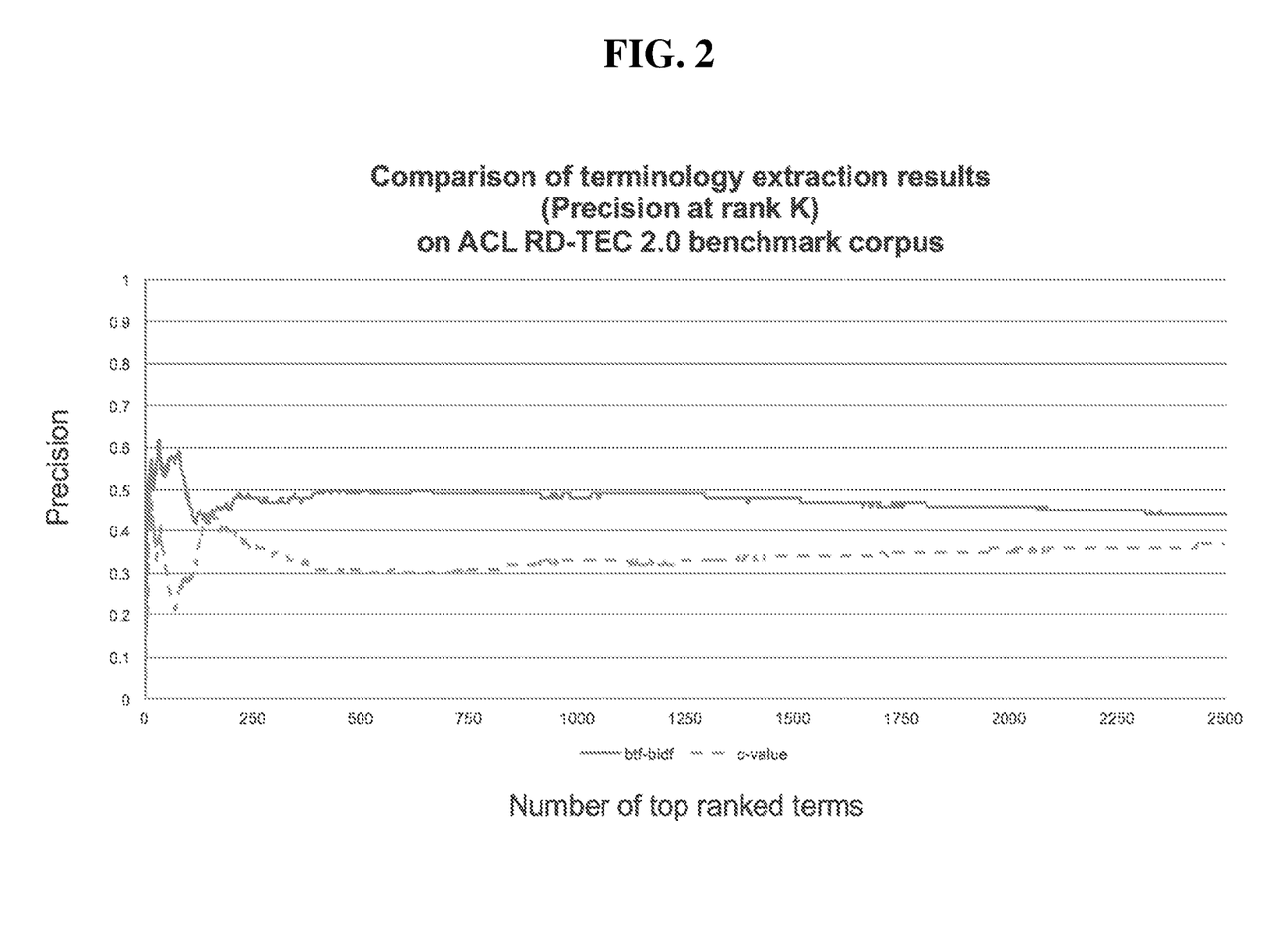
FIG. 2 exemplarily shows a comparison of terminology extraction results (Precision at rank K) on ACL RD-TEC 2.0 benchmark corpus.

Referring now to FIG. 2, FIG. 2 exemplarily shows the comparison of results (accuracy at top N ranked terms) between the inventive BTF-BIDF ranking method and the c-value conventional techniques. The evaluation is done on the ACL RD-TED 2.0 benchmark terminology extraction data. The particular benchmark dataset has total 3,318 domain-specific terms (i.e. the terminology size). What important is to see whether BTF-BIDF was able to consistently perform better than c-value over a longer range (the image shows for top 2500 ranked terms for both BTF_BIDF and c-value). As depicted in FIG. 2, the invention of method 100 consistently out performs the prior techniques.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge aver the exact location of the provided resources but may be able to specify location at a higher level of abstraction (e.g., country, state, or datacenter).

Rapid elasticity: capabilities can he rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure: The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
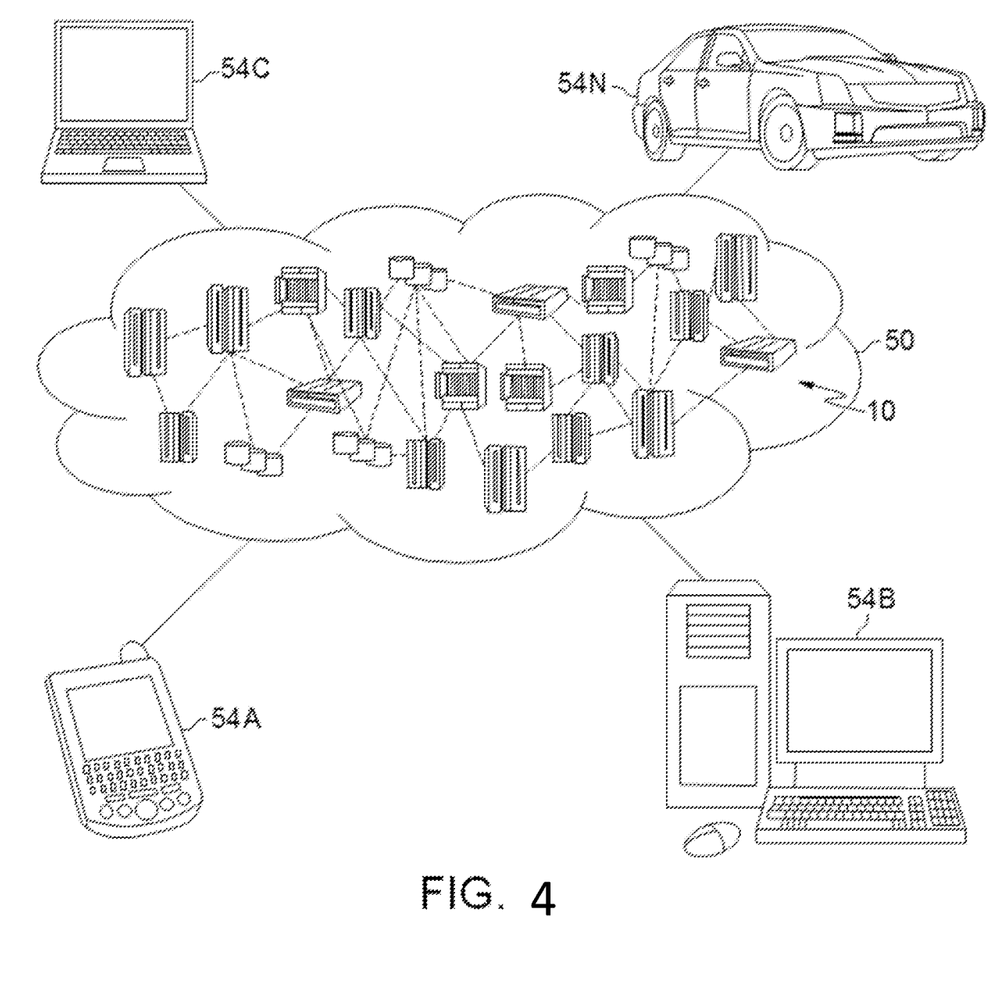
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
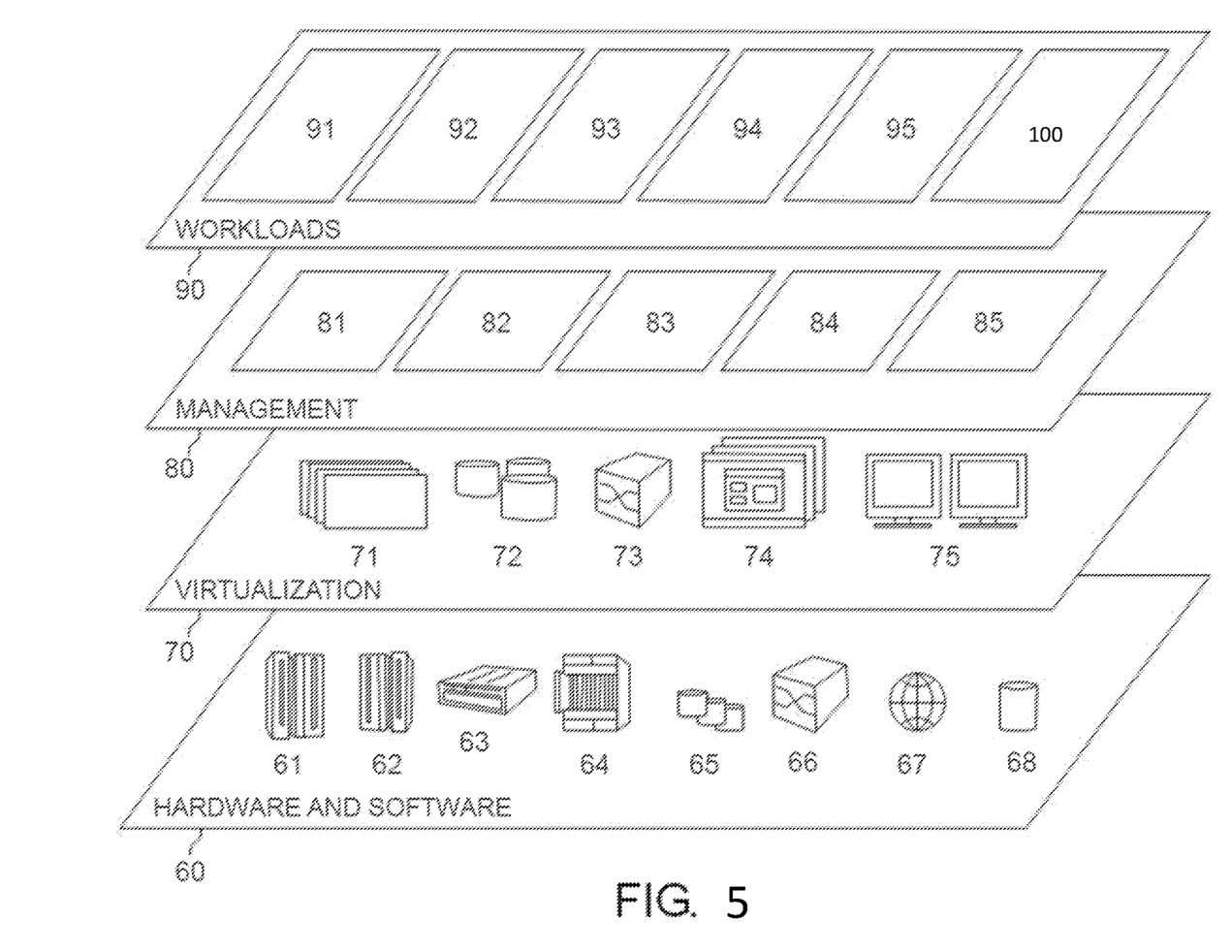
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architectures based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform it tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and terminology extraction method 100 in accordance with the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention ay be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architectures, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented terminology extraction method for an application in natural language processing, the method comprising:
    extracting, for the application in natural language processing, candidate terms from a corpus of text specific to a domain;
    calculating a Boosted Term Frequency (BTF) and a Boosted Inverse Document Frequency (BIDF) for the candidate terms with a relation to other candidate terms to obtain a BTF-BIDF score for every teen in the domain; and
    ranking the candidate terms based on the BTF-BIDF score,
    wherein the BTF includes increasing a value of a term relative to the other candidate terms based on a frequency of the term relative to the other candidate terms in the corpus of text,
    wherein the BTF of a candidate term comprises a Term Frequency (TF) of the candidate term plus a square-root of an average difference of the TF of the candidate term and that of any noun token of which the TF is greater than or equal to the TF of the candidate term,
    wherein the BIDF of a noun token comprises the highest Inverse Document Frequency (IDF) among all the candidate terms that include that noun token, the BIDF of a term comprising the highest BIDF among all the noun tokens of that term, and
    wherein a data file is output including the ranked candidate terms based on the BTF-BIDF score for the domain,
    further comprising:
        exploiting an output of an abbreviation of the candidate terms to adjust the BTF-BIDF score corresponding to the abbreviation such that the ranking differences between the candidate terms are changed, wherein the abbreviation and the candidate terms have equal important after the adjusting; and
        producing a terminology based on a filtering of the BTF-BIDF score.

2. The computer-implemented method of claim 1, wherein the filtering is based on at least one of:
    filtering the candidate terms below a median score of the BTF-BIDF score;
    filtering the candidate terms based on an average score of the BTF-BIDF score;
    filtering the candidate terms based on a threshold value of the BTF-BIDF score; and
    filtering a predetermined first number of candidate terms.

3. The computer-implemented method of claim 1, wherein the Boosted Tenn Frequency (BTF) is based on candidate terms that are related in a domain being equally or similarly important with a difference among their term frequencies, and
    wherein the Boosted Inverse Document Frequency (BIDF) is based on candidate terms that share common noun tokens in a domain corpus and are likely to be related.

4. The computer-implemented method of claim 1, embodied in a cloud-computing environment.

5. A computer program product for terminology extraction for an application in natural language processing, the computer program product comprising a computer-readable storage medium having program instructions embodied therewith, the program instructions executable by a computer to cause the computer to perform:
    extracting, for the application in natural language processing, candidate terms from a corpus of text specific to a domain;
    calculating a Boosted Term Frequency (BTF) and a Boosted Inverse Document Frequency (BIDF) for the candidate terms with a relation to other candidate terms to obtain a BTF-BIDF score for every term in the domain; and
    ranking the candidate terms based on the BTF-BIDF score,
    wherein the BTF includes increasing a value of a term relative to the other candidate terms based on a frequency of the term relative to the other candidate terms in the corpus of text,
    wherein the BTF of a candidate term comprises a Term Frequency (TF) of the candidate term plus a square-root of an average difference of the TF of the candidate term and that of any noun token of which the IF is greater than or equal to the TF of the candidate term,
    wherein the BIDF of a noun token comprises the highest Inverse Document Frequency (IDF) among all the candidate terms that include that noun token, the BIDF of a term comprising the highest BIDF among all the noun tokens of that term, and
    wherein a data file is output including the ranked candidate terms based on the BTF-BIDF score for the domain,
    further comprising:
        exploiting an output of an abbreviation of the candidate terms to adjust the BTF-BIDF score corresponding to the abbreviation such that the ranking differences between the candidate terms are changed, wherein the abbreviation and the candidate terms have equal important after the adjusting; and
        producing a terminology based on a filtering of the BTF-BIDF score.

6. The computer program product of claim 5, wherein the filtering is based on at least one of:
    filtering the candidate terms below a median score of the BTF-BIDF score;
    filtering the candidate terms based on an average score of the BTF-BIDF score;
    filtering the candidate terms based on a threshold value of the BTF-BIDF score; and
    filtering a predetermined first number of candidate terms.

7. The computer program product of claim 5, wherein the Boosted Term Frequency (BTF) is based on candidate terms that are related in a domain being equally or similarly important with a difference among their term frequencies, and
    wherein the Boosted Inverse Document Frequency (BIDF) is based on candidate terms that share common noun tokens in a domain corpus and are likely to be related.

8. A terminology extraction system for an application in natural language processing, said system comprising:
a processor; and
a memory, the memory storing instructions to cause the processor to perform:
extracting, for the application in natural language processing, candidate terms from a corpus of text specific to a domain;
calculating a Boosted Term. Frequency (BTF) and a Boosted Inverse Document Frequency (BIDF) for the candidate terms with a relation to other candidate terms to obtain a BTF-BIDF score for every term in the domain; and
ranking the candidate terms based on the BTF-BIDF score,
wherein the BTF includes increasing a value of a term relative to the other candidate terms based on a frequency of the term relative to the other candidate terms in the corpus of text,
wherein the BTF of a candidate term comprises a Tenn Frequency (TF) of the candidate term plus a square-root of an average difference of the TF of the candidate term and that of any noun token of which the TF is greater than or equal to the TF of the candidate term,
wherein the BIDF of a noun token comprises the highest Inverse Document Frequency (IDF) among all the candidate WI is that include that noun token, the BIDF of a term comprising the highest BIDF among all the noun tokens of that term, and
wherein a data file is output including the ranked candidate terms based on the BTF-BIDF score for the domain,
further comprising:
exploiting an output of an abbreviation of the candidate terms to adjust the BTF-BIDF score corresponding to the abbreviation such that the ranking differences between the candidate terms are changed, wherein the abbreviation and the candidate terms have equal important after the adjusting; and
producing a terminology based on a filtering of the BTF-BIDF score.

9. The system of claim 8, wherein the filtering is based on at least one of:
filtering the candidate terms below a median score of the BTF-BIDF score;
filtering the candidate terms based on an average score of the BTF-BIDF score;
filtering the candidate terms based on a threshold value of the BTF-BIDF score; and
filtering a predetermined first number of candidate terms.

10. The system of claim 8, wherein the Boosted Term Frequency (BTF) is based on candidate terms that are related in a domain being equally or similarly important with a difference among their term frequencies, and
wherein the Boosted Inverse Document Frequency (BIDF) is based on candidate terms that share common noun tokens in a domain corpus and are likely to be related.

11. The system of claim 10, embodied in a cloud-computing environment.

* * * * *